United States Patent
Han et al.

(10) Patent No.: US 10,637,097 B2
(45) Date of Patent: Apr. 28, 2020

(54) ORGANIC/INORGANIC COMPOSITE ELECTROLYTE, ELECTRODE-ELECTROLYTE ASSEMBLY AND LITHIUM SECONDARY BATTERY INCLUDING THE SAME, AND MANUFACTURING METHOD OF THE ELECTRODE-ELECTROLYTE ASSEMBLY

(71) Applicants: SAMSUNG SDI CO., LTD., Yongin-si, Gyeonggi-do (KR);
Industry-University Cooperation Foundation Hanyang University, Seoul (KR)

(72) Inventors: Manseok Han, Yongin-si (KR);
Woocheol Shin, Yongin-si (KR);
Duckhyun Kim, Yongin-si (KR);
Moonsung Kim, Yongin-si (KR);
Jeonghye Lee, Yongin-si (KR);
Dongwon Kim, Seoul (KR); Yunchae Jung, Seoul (KR); Seulki Kim, Uiwang-si (KR)

(73) Assignees: Samsung SDI Co., Ltd., Yongin-Si, Gyeonggi-do (KR); Hanyang University Cooperation Foundation Hanyang University, Seoul (KR)

( * ) Notice: Subject to any disclaimer, the term of this patent is extended or adjusted under 35 U.S.C. 154(b) by 521 days.

(21) Appl. No.: 14/751,269

(22) Filed: Jun. 26, 2015

(65) Prior Publication Data
US 2016/0164138 A1 Jun. 9, 2016

(30) Foreign Application Priority Data

Dec. 5, 2014 (KR) .................. 10-2014-0174261

(51) Int. Cl.
*H01M 10/0565* (2010.01)
*H01M 10/052* (2010.01)
*H01M 10/056* (2010.01)

(52) U.S. Cl.
CPC ..... *H01M 10/0565* (2013.01); *H01M 10/052* (2013.01); *H01M 10/056* (2013.01); *Y02T 10/7011* (2013.01)

(58) Field of Classification Search
CPC ........... H01M 10/0565; H01M 10/052; H01M 10/056
See application file for complete search history.

(56) References Cited

U.S. PATENT DOCUMENTS

| | | | |
|---|---|---|---|
| 9,362,546 B1 * | 6/2016 | Donnelly | ............... C04B 35/00 |
| 2006/0008700 A1 | 1/2006 | Yong et al. | |

(Continued)

FOREIGN PATENT DOCUMENTS

| | | |
|---|---|---|
| JP | 2011-159528 A | 8/2011 |
| JP | 2014-067574 A | 4/2014 |

(Continued)

OTHER PUBLICATIONS

Kamaya et al, "A lithium superionic conductor", Nature materials, Jul. 31, 2011, 682-686, vol. 10, Macmillan Publishers Limited.

(Continued)

*Primary Examiner* — Helen Oi K Conley
(74) *Attorney, Agent, or Firm* — Lee IP Law, PC

(57) ABSTRACT

Provided are an organic/inorganic composite electrolyte, an electrode-electrolyte assembly and a lithium secondary battery including the organic/inorganic composite electrolyte, and a manufacturing method of the electrode-electrolyte assembly. The porous organic/inorganic composite electrolyte, includes a first pore peak in a pore size range of about 100 nm to about 300 nm in a total pore distribution chart, (Continued)

and 50% or more of pores having a pore size range of about 100 nm to about 300 nm based on a total pore volume.

15 Claims, 12 Drawing Sheets

(56) References Cited

U.S. PATENT DOCUMENTS

| | | | |
|---|---|---|---|
| 2007/0231702 A1* | 10/2007 | Fujita | B60L 11/123 |
| | | | 429/247 |
| 2014/0011100 A1* | 1/2014 | Lee | H01M 8/1016 |
| | | | 429/403 |
| 2014/0170504 A1 | 6/2014 | Baek et al. | |

FOREIGN PATENT DOCUMENTS

| | | |
|---|---|---|
| KR | 10-2006-0021222 A | 3/2006 |
| KR | 10-2014-0077618 A | 6/2014 |

OTHER PUBLICATIONS

Mizuno wr al, "New, Highly Ion-Conductive Crystals Precipitated from Li2S—P2S5 Glasses", Advanced materials, p. 918-921, vol. 10, Wiley-VCH Verlag GmbH.

* cited by examiner

ORGANIC/INORGANIC COMPOSITE ELECTROLYTE, ELECTRODE-ELECTROLYTE ASSEMBLY AND LITHIUM SECONDARY BATTERY INCLUDING THE SAME, AND MANUFACTURING METHOD OF THE ELECTRODE-ELECTROLYTE ASSEMBLY

CROSS-REFERENCE TO RELATED APPLICATION

Korean Patent Application No. 10-2014-0174261, filed on Dec. 5, 2014, in the Korean Intellectual Property Office, and entitled: "Organic/Inorganic Composite Electrolyte, Electrode-Electrolyte Assembly and Lithium Secondary Battery Including the Same, and Manufacturing Method of the Electrode-Electrolyte Assembly," is incorporated by reference herein in its entirety.

BACKGROUND

1. Field

One or more exemplary embodiments relate to an organic/inorganic composite electrolyte, an electrode-electrolyte assembly and a lithium secondary battery including the organic/inorganic composite electrolyte, and a manufacturing method of the electrode-electrolyte assembly.

2. Description of the Related Art

Lithium secondary batteries may be used as a main power for portable devices as high performance batteries having the highest energy densities. Lithium secondary batteries may be used as power sources for, for example, eco-friendly electric vehicles and energy storage devices for new and renewable energies.

SUMMARY

Embodiments may be realized by providing a porous organic/inorganic composite electrolyte, including a first pore peak in a pore size range of about 100 nm to about 300 nm in a total pore distribution chart, and 50% or more of pores having a pore size range of about 100 nm to about 300 nm based on a total pore volume.

The organic/inorganic composite electrolyte may further include a second pore peak in a pore size range of about 1,000 nm to about 2,000 nm in the total pore distribution chart.

The organic/inorganic composite electrolyte may include 5% to about 20% of pores having a pore size range of about 1,000 nm to about 2,000 nm based on the total pore volume.

The organic/inorganic composite electrolyte may include a porous organic matrix; and lithium ion conductive inorganic particles embedded and dispersed in the organic matrix.

The organic matrix may include a polymer for a gel polymer electrolyte.

The organic matrix may include one or more of PVdF (polyvinylidene fluoride), a PVdF-HFP copolymer (polyvinylidene fluoride-hexafluoropropylene copolymer), a PVdF-TFE copolymer (polyvinylidene fluoride-tetrafluoroethylene copolymer), a PVdF-CTFE copolymer (polyvinylidene fluoride-chlorotrifluoroethylene copolymer), a PVdF-PFA copolymer (polyvinylidene fluoride-perfluorovinylether copolymer), PAN (polyacrylonitrile), PMMA (poly(methyl methacrylate)), PEO (poly(ethylene oxide)), PPO (polypropylene oxide), PVC (polyvinyl chloride), PVA (polyvinyl alcohol), PVAc (polyvinyl acetate), PVN (polyvinyl naphthalene), polyester sulfide, polybutadiene, derivatives thereof, or a copolymer thereof.

The inorganic particles may include one or more of an oxide-based material, a phosphate-based inorganic material, a sulfide-based inorganic material, or a LiPON-based inorganic material that have lithium ion conductivity.

The oxide-based inorganic material may include one or more components represented by $Li_{3x}La_{2/(3-x)}TiO_3$ ($0<x\leq2$) or $Li_{7-y}La_{3-x}A_xZr_{2-y}M_yO_{12}$ where A is Y, Nd, Sm or Gd, M is Nb or Ta, $0\leq x<3$, and $0\leq y<2$); the phosphate-based inorganic material may include one or more components represented by $Li_{1+x+y}(Al, Ga)_x(Ti, Ge)_{2-x}SiP_{3-y}O_{12}$ where $0\leq X\leq1$ and $0\leq y\leq1$; the sulfide-based inorganic material may include one or more of $Li_2S$, $Li_2S$—$P_2S_5$, $Li_2S$—$SiS_2$, $Li_2S$—$GeS_2$, $Li_2S$—$B_2S_5$, or $Li_2S$—$Al_2S_5$; and the LiPON-based inorganic material may include one or more components represented by $Li_{3-y}PO_{4-x}N_x$ where $0<y<3$ and $0<x<4$.

The organic matrix and the inorganic particles may be present in a weight ratio of about 50:50 to about 1:99.

The organic/inorganic composite electrolyte may further include a liquid electrolyte impregnated in the organic/inorganic composite electrolyte.

Embodiments may be realized by providing an electrode-electrolyte assembly, including an electrode; and an electrolyte layer disposed on at least one side of the electrode and including the presently disclosed organic/inorganic composite electrolyte.

The electrolyte layer may have a thickness of about 1 μm to about 200 μm.

A thickness ratio of the electrode and the electrolyte layer may be about 100:1 to about 100:1,000.

Embodiments may be realized by providing a lithium secondary battery, including the presently disclosed electrode-electrolyte assembly.

Embodiments may be realized by providing a method of manufacturing an electrode-electrolyte assembly, the method including preparing an electrolyte slurry including lithium ion conductive inorganic particles, a polymer for a gel polymer electrolyte, a pore-forming agent, and a first organic solvent; applying the electrolyte slurry to at least one side of an electrode and drying the electrolyte slurry applied to the electrode so as to form an organic/inorganic composite electrolyte layer; and removing the pore-forming agent from the organic/inorganic composite electrolyte layer using a second organic solvent.

The pore-forming agent may include one or more of dibutyl phthalate (DBP), dioctyl phthalate (DOP), ethylene carbonate (EC), or propylene carbonate (PC).

The first organic solvent may include one or more of acetone, tetrahydrofuran (THF), dimethylformamide (DMF), dimethyl sulfoxide (DMSO), dimethylacetamide (DMAc), or N-methyl pyrrolidone (NMP).

The second organic solvent may include one or more of methanol, ethanol, dimethyl carbonate, hexane, heptane, octane, or diethyl ether.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
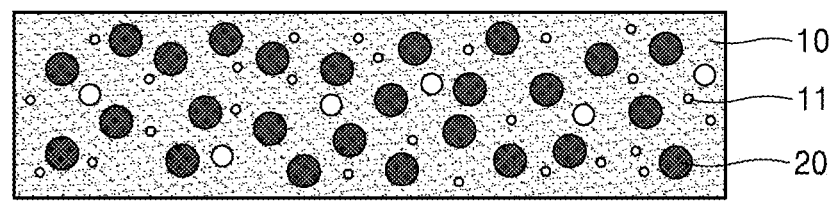
FIG. 1 illustrates a rough structure of an organic/inorganic composite electrolyte according to one or more exemplary embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In the drawing figures, the dimensions of elements may be exaggerated for clarity of illustration. As used herein, the term "and/or" includes any and all combinations of one or more of the associated listed items. Expressions such as "at least one of" when preceding a list of elements, modify the entire list of elements and do not modify the individual elements of the list.

Hereinafter, the present disclosure will be described more in detail.

[Organic/inorganic Composite Electrolyte]

An organic/inorganic composite electrolyte according to one aspect of the present disclosure may include an electrolyte layer that may not require use of a porous separator substrate, and inorganic particles having lithium ion transfer capability used as a solid component of the electrolyte to increase battery characteristics and safety of a lithium secondary battery by reducing thickness of the electrolyte layer and lowering the content of a liquid electrolyte existing in the electrolyte layer.

According to one or more exemplary embodiments, the organic/inorganic composite electrolyte may include pores having a pore size range of about 10 nm to about 2,000 nm, and may have a porosity of about 5% to about 50%.

According to one or more exemplary embodiments, the organic/inorganic composite electrolyte may be porous and may include: a first pore peak existing in a pore size range of about 100 nm to about 300 nm in the total pore distribution chart; and pores having a pore size range of about 100 nm to about 300 nm and accounting for about 50% or more of the total pore volume.

As illustrated in FIG. 1, the organic/inorganic composite electrolyte may have a structure including: a porous organic matrix 10; and lithium ion conductive inorganic particles 20 embedded and dispersed into the organic matrix 10. The same pore distributions as those described above may be formed in predetermined sized pores 11 existing in the organic matrix 10.

The pores having a pore size range of about 100 nm to about 300 nm may account for about 50% or more, e.g., 60% or more, 70% or more, or 80% or more of the total pore volume.

The pores having a pore size range of about 100 nm to about 300 nm may be uniformly distributed in the organic matrix 10 to help impregnation of a liquid electrolyte into the organic/inorganic composite electrolyte and to have the ion conductivity revealed within the organic matrix 10.

The organic/inorganic composite electrolyte may additionally include: a second pore peak existing in a pore size range of about 1,000 nm to about 2,000 nm in the total pore distribution chart; and pores having a pore size range of about 1,000 nm to about 2,000 nm and accounting for about 5% to about 20%, e.g., about 5% to about 10% of the total pore volume.

The pores having a pore size range of about 1,000 nm to about 2,000 nm may mostly be expected to be formed in interfaces between the organic matrix 10 and the inorganic particles 20 and may play a linking role enabling ion conduction between the inorganic particles 20 and the organic matrix 10 by having a liquid electrolyte brought into contact with the inorganic particles 20 and the organic matrix 10 between the inorganic particles 20 and the organic matrix 10.

The organic/inorganic composite electrolyte having such pore distributions may be prepared using an electrolyte slurry including lithium ion conductive inorganic particles, a polymer for, e.g., of, a gel polymer electrolyte, and a pore-forming agent. For example, after the electrolyte slurry is coated and dried on an electrode, an appropriate solvent may be used to extract the pore-forming agent such that a porous organic/inorganic composite electrolyte having the pore distributions may be formed.

The total porosity and the average pore size may be increased by the pore-forming agent compared to a comparative organic/inorganic composite electrolyte prepared without using the pore-forming agent, and the total porosity and the average pore size may have pore distributions which are shifted to a side in which major pore peaks are large.

A polymer for a gel polymer electrolyte may be used as a polymer composing the organic matrix 10. Examples of the polymer for the gel polymer electrolyte may include PVdF (polyvinylidene fluoride), a PVdF-HFP copolymer (polyvinylidene fluoride-hexafluoropropylene copolymer), a PVdF-TFE copolymer (polyvinylidene fluoride-tetrafluoroethylene copolymer), a PVdF-CTFE copolymer (polyvinylidene fluoride-chlorotrifluoroethylene copolymer), a PVdF-PFA copolymer (polyvinylidene fluoride-perfluorovinylether copolymer), PAN (polyacrylonitrile), PMMA (poly (methyl methacrylate)), PEO (poly(ethylene oxide)), PPO (polypropylene oxide), PVC (polyvinyl chloride), PVA (polyvinyl alcohol), PVAc (polyvinyl acetate), PVN (polyvinyl naphthalene), polyester sulfide, polybutadiene, derivatives thereof, copolymers thereof, and combinations thereof.

The polymer for the gel polymer electrolyte may be distinguished from a water-based binder used in an electrode. An electrolyte slurry including a water-based binder may be directly coated on the electrode. The polymer for the gel polymer electrolyte may not damage the electrode or deform the form of the electrode.

The inorganic particles may include one or more of oxide-based, phosphate-based, sulfide-based, or LiPON-based inorganic materials having lithium ion conductivities.

Examples of the oxide-based inorganic materials may include one or more components represented by $Li_{3x}La_{2/(3-x)}TiO_3$ ($0<x\leq2$) or $Li_{7-y}La_{3-x}A_xZr_{2-y}M_yO_{12}$ (wherein, A is Y, Nd, Sm or Gd, M is Nb or Ta, $0\leq x<3$, and $0\leq y<2$). According to one or more exemplary embodiments, the oxide-based inorganic materials may include $Li_7La_3Zr_2O_{12}$ wherein x=0 and y=0 in $Li_{7-y}La_{3-x}A_xZr_{2-y}M_yO_{12}$.

Examples of the phosphate-based inorganic materials may include one or more components represented by $Li_{1+x+y}(Al, Ga)_x(Ti, Ge)_{2-x}Si_yP_{3-y}O_{12}$ (wherein, $0\leq X\leq1$ and $0\leq y\leq1$).

Examples of the sulfide-based inorganic materials may include one or more of $Li_2S$, $Li_2S-P_2S_5$, $Li_2S-SiS_2$, $Li_2S-GeS_2$, $Li_2S-B_2S_5$, or $Li_2S-Al_2S_5$. According to one or more exemplary embodiments, the sulfide-based inorganic materials may include $Li_2S-P_2S_5$. For example, $Li_2S-P_2S_5$ may include about 68% by mol to 82% by mol of $Li_2S$ and about 18% by mol to about 32% by mol of $P_2S_5$.

Examples of the LiPON-based inorganic materials may include one or more components represented by $Li_{3-y}PO_{4-x}N_x$ (wherein, $0<y<3$ and $0<x<4$).

In an embodiment, materials that may be used in the related art may be used as the inorganic particles.

According to one or more exemplary embodiments, the organic/inorganic composite electrolyte may include the organic matrix 10 and the inorganic particles 20 at a weight ratio of about 50:50 to about 1:99. For example, the organic/inorganic composite electrolyte may include the organic matrix 10 and the inorganic particles 20 in a weight ratio of about 30:70 to about 5:95, or about 20:80 to about 10:90.

The organic/inorganic composite electrolyte may be capable of maintaining a high ion conductivity while decreasing the content of a liquid electrolyte existing in the electrolyte layer by distributing lithium ion conductive inorganic particles 20 within the organic matrix 10, thereby decreasing thickness of an electrolyte layer. Accordingly, the organic/inorganic composite electrolyte may be capable of improving battery characteristics and battery safety.

[Electrode-electrolyte Assembly]

An electrode-electrolyte assembly according to other aspect of the present disclosure may include:

an electrode; and an electrolyte layer including the above-described organic/inorganic composite electrolyte disposed on at least one side of the electrode.

According to one or more exemplary embodiments, the electrolyte layer may have a thickness range of about 1 μm to about 200 μm. The amount of a liquid electrolyte impregnated into the electrolyte layer may be reduced by controlling thickness of the electrolyte layer in the thickness range.

As the thickness of the electrolyte layer is reduced, the electrode and the organic/inorganic composite electrolyte may have a thickness ratio of about 100:1 to about 100:1, 000.

The electrode-electrolyte assembly may be manufactured by coating the organic/inorganic composite electrolyte on a positive electrode, a negative electrode, or both the positive electrode and the negative electrode. A detailed manufacturing method of the electrode-electrolyte assembly will be described later.

A separate separator substrate may not need to be used in the electrolyte layer of the electrode-electrolyte assembly, and difficulties associated with polyolefin series separators may be reduced or avoided.

[Manufacturing an Electrode-electrolyte Assembly]

An electrode-electrolyte assembly manufacturing method according to another aspect of the present disclosure may include:

preparing an electrolyte slurry including lithium ion conductive inorganic particles, a polymer for a gel polymer electrolyte, a pore-forming agent, and a first organic solvent;

coating the electrolyte slurry on at least one side of an electrode and drying the electrolyte slurry coated on the electrode to form an organic/inorganic composite electrolyte layer; and removing the pore-forming agent from the organic/inorganic composite electrolyte layer using a second organic solvent.

Materials that may be used as the inorganic particles and the polymer for the gel polymer electrolyte may be the same as those described above.

The pore-forming agent may be used to form the organic/inorganic composite electrolyte layer as a porous body having a predetermined pore distribution. Examples of the pore-forming agent may include dibutyl phthalate (DBP), dioctyl phthalate (DOP), ethylene carbonate (EC), and propylene carbonate (PC).

Organic solvents having non-polarity to the extent that does not damage the electrode while maintaining an appropriate solubility with respect to the polymer for the gel polymer electrolyte may be used as the first organic solvent used in the electrolyte slurry. Examples of the usable first organic solvent may include acetone, tetrahydrofuran (THF), dimethylformamide (DMF), dimethyl sulfoxide (DMSO), dimethylacetamide (DMAc) and N-methyl pyrrolidone (NMP). The first organic solvent may be used alone or in a combination of two or more thereof.

The first organic solvent may be selected according to types of the polymer for the gel polymer electrolyte used, and, for example, acetone may be used as the first organic solvent when PVdF series polymers such as PVdF-HFP copolymers are used as the polymer for the gel polymer electrolyte.

The lithium ion conductive inorganic particles, the polymer for the gel polymer electrolyte, the pore-forming agent and the first organic solvent are mixed to prepare an electrolyte slurry.

A milling process such as ball milling may be applied to uniformly disperse the above-mentioned materials into the first organic solvent.

The milling process may be performed using, for example, a bead mill, high energy ball mill, planetary mill, stirred ball mill, or vibration mill. Materials that may not react with ceramic compounds and may be chemically inert may be used as the beads mill or the ball mills. For example, the beads mill or the ball mills made of zirconia may be used. For example, beads of the beads mill or the ball mills may have a size range of about 0.3 mm to about 10 mm.

The prepared electrolyte slurry may be coated and dried on at least one side of an electrode to form an organic/inorganic composite electrolyte layer. The electrolyte slurry may be coated on a positive electrode, a negative electrode, or both the positive electrode and the negative electrode.

The pore-forming agent may still exist in the organic/inorganic composite electrolyte layer formed after coating and drying the electrolyte slurry on the electrode, and the pore-forming agent may be removed from the organic/inorganic composite electrolyte layer using the second organic solvent such that the organic/inorganic composite electrolyte layer may be formed into a porous body having a predetermined pore distribution.

Organic solvents having polarity to the extent that may dissolve and extract the pore-forming agent without damaging polymers used in the electrode and the organic/inorganic composite electrolyte layer may be used as the second organic solvent used in removing the pore-forming agent. Examples of the usable second organic solvent may include methanol, ethanol, dimethyl carbonate, hexane, heptane, octane and diethyl ether. The second organic solvent may be used alone or in a combination of two or more thereof. For example, when dibutyl phthalate (DBP) is used as the pore-forming agent, methanol may be suitably used as the second organic solvent.

[Lithium Secondary Battery]

A lithium secondary battery according to another aspect of the present disclosure may include the above-described electrode-electrolyte assembly.

The lithium second battery may have increased cycle, e.g., electrochemical, characteristics and battery safety by employing the above-described organic/inorganic composite electrolyte that not only may reduce the content of a liquid electrolyte, but also may maintain a high ion conductivity.

The lithium secondary battery may include a positive electrode, a negative electrode, and an electrolyte layer which is interposed between the positive electrode and the negative electrode, and may include the above-described organic/inorganic composite electrolyte, wherein the electrolyte layer is assembled with the positive electrode, the negative electrode, or both of the positive electrode and the negative electrode to form an electrode-electrolyte assembly, and the electrolyte layer may be formed in a structure into which a liquid electrolyte may be impregnated.

The lithium secondary battery may be prepared as follows.

The positive electrode may include a positive electrode active material, and, for example, the positive electrode may be manufactured by a method of molding the positive electrode active material composition into a predetermined shape or coating the positive electrode active material composition on a current collector such as a copper foil after preparing a positive electrode active material composition by mixing a positive electrode active material, a conducting agent and a binder in a solvent.

The positive electrode active material is material that may be capable of performing intercalation or deintercalation of lithium ions. Materials that may be used in the related art may be used as the positive electrode active material. Examples of the positive electrode active material may include one or more compounds represented by the following formulas: $Li_aAl_{1-b}B_bD_2$ (wherein, $0.90 \le a \le 1.8$ and $0 \le b \le 0.5$); $Li_aE_{1-b}B_bO_{2-c}D_c$ (wherein, $0.90 \le a \le 1.8$, $0 \le b \le 0.5$, and $0 \le c \le 0.05$); $LiE_{2-b}E_bO_{4-c}D_c$ (wherein, $0 \le b \le 0.5$ and $0 \le c \le 0.05$); $Li_aNi_{1-b-c}Co_bB_cD_\alpha$ (wherein, $0.90 \le a \le 1.8$, $0 \le b \le 0.5$, $0 \le c \le 0.05$, and $0 < \alpha \le 2$); $Li_aNi_{1-b-c}Co_bB_cO_{2-\alpha}F_\alpha$ (wherein, $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_2$ (wherein, $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (wherein, $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ (wherein, $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_2$ (wherein, $0.90 \le a \le 1.8$, $0 \le b \le 0.5$, $0 \le c \le 0.05$, and $0 < \alpha < 2$); $Li_aNi_bE_cG_dO_2$ (wherein, $0.90 \le a \le 1.8$, $0 \le b \le 0.9$, $0 \le c \le 0.5$, and $0.001 \le d \le 0.1$); $Li_aNi_bCo_cMn_dG_eO_2$ (wherein, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein, $0.90 \le a \le 1.8$ and $0.001 \le b \le 0.1$); $Li_aCoG_bO_2$ (wherein, $0.90 \le a \le 1.8$ and $0.001 \le b \le 0.1$); $Li_aMnG_bO_2$ (wherein, $0.90 \le a \le 1.8$ and $0.001 \le b \le 0.1$); $Li_aMn_2G_bO_4$ (wherein, $0.90 \le a \le 1.8$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein, $0 \le f \le 2$); $Li_{(3-f)}Fe_2(PO_4)_3$ (wherein, $0 \le f \le 2$); and $LiFePO_4$.

In the Formulas above, the letters A, B, D, E, F, G, Q, I, and J represent variables, as further defined. For example, the letter A may be Ni, Co, Mn, or combinations thereof; the letter B may be Al, Ni, Co, Mn, Cr, Fe, Mg, Sr, V, rare earth elements, or combinations thereof; the letter D may be O, F, S, P, or combinations thereof; the letter E may be Co, Mn, or a combination thereof; the letter F may be F, S, P, or combinations thereof; the letter G may be Al, Cr, Mn, Fe, Mg, La, Ce, Sr, V, or combinations thereof; the letter Q may be Ti, Mo, Mn, or combinations thereof; the letter I may be Cr, V, Fe, Sc, Y, or combinations thereof; and the letter J may be V, Cr, Mn, Co, Ni, Cu, or combinations thereof.

Examples of the positive electrode active material may include one or more of $LiCoO_2$, $LiNiO$, $LiMnO_2$, $LiMn_2O_4$, $Li(Ni_aCo_bMn_c)O_2$ (wherein, $0 < a < 1$, $0 < b < 1$, $0 < c < 1$, and $a+b+c=1$), $LiNi_{1-y}Co_yO_2$ (wherein, $0 \le y < 1$), $LiCo_{1-y}Mn_yO_2$ (wherein, $0 \le y < 1$), $LiNi_{1-y}Mn_yO_2$ (wherein, $0 \le y < 1$), $LiMn_{2-z}Ni_zO_4$ (wherein, $0 < z < 2$), $LiMn_{2-z}Co_zO_4$ (wherein, $0 < z < 2$), $V_2O_5$, TiS or MoS.

The conducting agent used in the positive electrode active material composition may provide the positive electrode active material with a conducting path to improve electrical conductivity. Conducting materials that may be used in lithium secondary batteries may be used as the conducting agent. Examples of the conducting agent may include conducting materials including: carbonaceous materials such as, for example, carbon black, acetylene black, Ketjen black, and carbon fibers (e.g., vapor grown carbon fibers); metal-based materials of metal powders or metal fibers such as, for example, copper, nickel, aluminum, and silver; conductive polymers such as polyphenylene derivatives; and mixtures thereof. The conducting agent may be used by properly adjusting the amount of the conducting agent contained in the positive electrode active material composition. For example, the positive electrode active material and the conducting agent may be added in a weight ratio of 99:1 to 90:10.

The binder used in the positive electrode active material composition is added in an amount of about 1 weight part to about 50 weight parts with respect to 100 weight parts of the positive electrode active material as a component of helping adhesion of, for example, the positive electrode active material and the conducting agent, and adhesion with respect to the current collector. For example, the binder may be added in an amount range of 1 weight part to 30 weight parts, about 1 weight part to about 20 weight parts, or about 1 weight part to about 15 weight parts based on 100 weight parts of the positive electrode active material. Examples of such a binder may include polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polystyrene, polymethyl methacrylate, polyaniline, acrylonitrile butadiene styrene, phenolic resin, epoxy resin, polyethylene terephthalate, polytetrafluoroethylene, polyphenylene sulfide, polyamide imide, polyetherimide, polyethylene sulfone, polyamide, polyacetal, polyphenylene oxide, polybutylene terephthalate, ethylene-propylene-diene terpolymer (EPDM), sulfonated EPDM, styrene butadiene rubber, fluorine rubber, or various copolymers.

Examples of the solvent may include N-methylpyrrolidone (NMP), acetone, or water. The solvent may be used in an amount range of about 1 weight part to about 100 weight parts based on 100 weight parts of the positive electrode active material. Maintaining an amount of solvent in the above-described range may help ease performance of an operation for forming an active material layer.

The current collector may be made to a thickness of about 3 μm to about 500 μm. The current collector may have conductivity without causing a chemical change in a relevant battery. Examples of the current collector may include: copper, stainless steel, aluminum, nickel, titanium, calcined carbon, calcined copper, or calcined stainless steel of which the surface is treated with, for example, carbon, nickel, titanium, or silver; or an aluminum-cadmium alloy. Examples of the current collector may include: copper, stainless steel, aluminum, nickel, titanium, calcined carbon, calcined copper, or calcined stainless steel on the surface of which fine irregularities may be formed to reinforce adhesion of the positive electrode active material; and various forms of, for example, films, sheets, foils, nets, porous bodies, foams, or non-woven fabrics.

The prepared positive electrode active material composition may be directly coated on the current collector to manufacture a positive electrode plate, or the positive electrode active material composition is cast onto a separate support such that a positive electrode active material film delaminated from the support is laminated on a copper foil current collector to obtain the positive electrode plate. In an embodiment, the positive electrode may be formed in other forms in addition to the above-mentioned forms.

Next, a negative electrode is prepared.

The negative electrode may be manufactured in the same method as the positive electrode except that a negative electrode active material instead of a positive electrode active material may be used.

Examples of the negative electrode active material include those that may be used in the related art. Examples of the negative electrode active material may include lithium metal, metals that may be capable of alloying lithium, transition metal oxides, materials that may be capable of doping or dedoping lithium, and materials that may be capable of reversibly performing intercalation or deintercalation of lithium ions.

Examples of the transition metal oxides may include tungsten oxides, molybdenum oxides, titanium oxides, lithium titanium oxides, vanadium oxides, and lithium vanadium oxides.

Examples of the materials that may be capable of doping or dedoping lithium may include Si, $SiO_x$ (0<x<2), Si—Y alloy (Y may be an alkali metal, an alkali earth metal, a Group 13 element, a Group 14 element, a Group 15 element, a Group 16 element, a transition metal, a rare earth element, or a combination thereof with Y not being Si), Sn, $SnO_2$, Sn—Y (Y may be an alkali metal, an alkali earth metal, a Group 13 element, a Group 14 element, a Group 15 element, a Group 16 element, a transition metal, a rare earth element, or a combination thereof with Y not being Sn), or a mixture of $SiO_2$ and at least one thereof. Examples of the element Y may include Mg, Ca, Sr, Ba, Ra, Sc, yttrium, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

The materials that may be capable of reversibly performing intercalation or deintercalation of lithium ions include carbonaceous (negative electrode active) materials that may be used in lithium batteries. Examples of the materials that may be capable of reversibly performing intercalation or deintercalation of lithium ions may include crystalline carbons, amorphous carbons, and mixtures thereof. Examples of the crystalline carbons may include: amorphous, plate-shaped, flake shaped, spherical or fibrous natural graphites; and artificial graphites. Examples of the amorphous carbons may include soft carbons (carbons calcined at low temperatures) or hard carbons, mesophase pitch carbides, and calcined cokes.

The same conducting agent, binder and solvent as those in the above-described positive electrode active material composition may be used in a negative electrode active material composition. In some cases, a plasticizer may be additionally added to the above-described positive electrode active material composition and the negative electrode active material composition to enable the formation of pores in electrode plates. The negative electrode active material, conducting agent, binder and solvent may be contained in amount levels that may be used in lithium secondary batteries.

The positive electrode and the negative electrode may be separated by an electrolyte layer including the above-described organic/inorganic composite electrolyte, and the electrolyte layer including the organic/inorganic composite electrolyte and a method for forming an electrode-electrolyte assembly using the electrolyte layer may be the same as described above.

The electrolyte layer may be impregnated with a liquid electrolyte.

The liquid electrolyte may include lithium salts and a non-aqueous electrolytic solution.

Examples of the non-aqueous electrolytic solution may include aprotic organic solvents such as N-methyl-2-pyrrolidone, propylene carbonate, ethylene carbonate, butylenes carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethyl formamide, dioxolane, acetonitrile, nitromethane, methyl formate, methyl acetate, triester phosphate, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Lithium salts may be used include those that may be used in lithium secondary batteries. Examples of the lithium salts, as materials that are well dissolved into the non-aqueous electrolyte, may include one or more of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, or 4-phenyllithium boric acid, and imide.

The lithium secondary batteries may be classified as cylindrical lithium secondary batteries, rectangular lithium secondary batteries, coin type lithium secondary batteries, pouch type lithium secondary batteries, etc depending on shapes of the lithium secondary batteries, and may be classified as bulk type lithium secondary batteries and thin film type lithium secondary batteries depending on sizes of the lithium secondary batteries.

These batteries may be manufactured by suitable methods.

Figure 2:
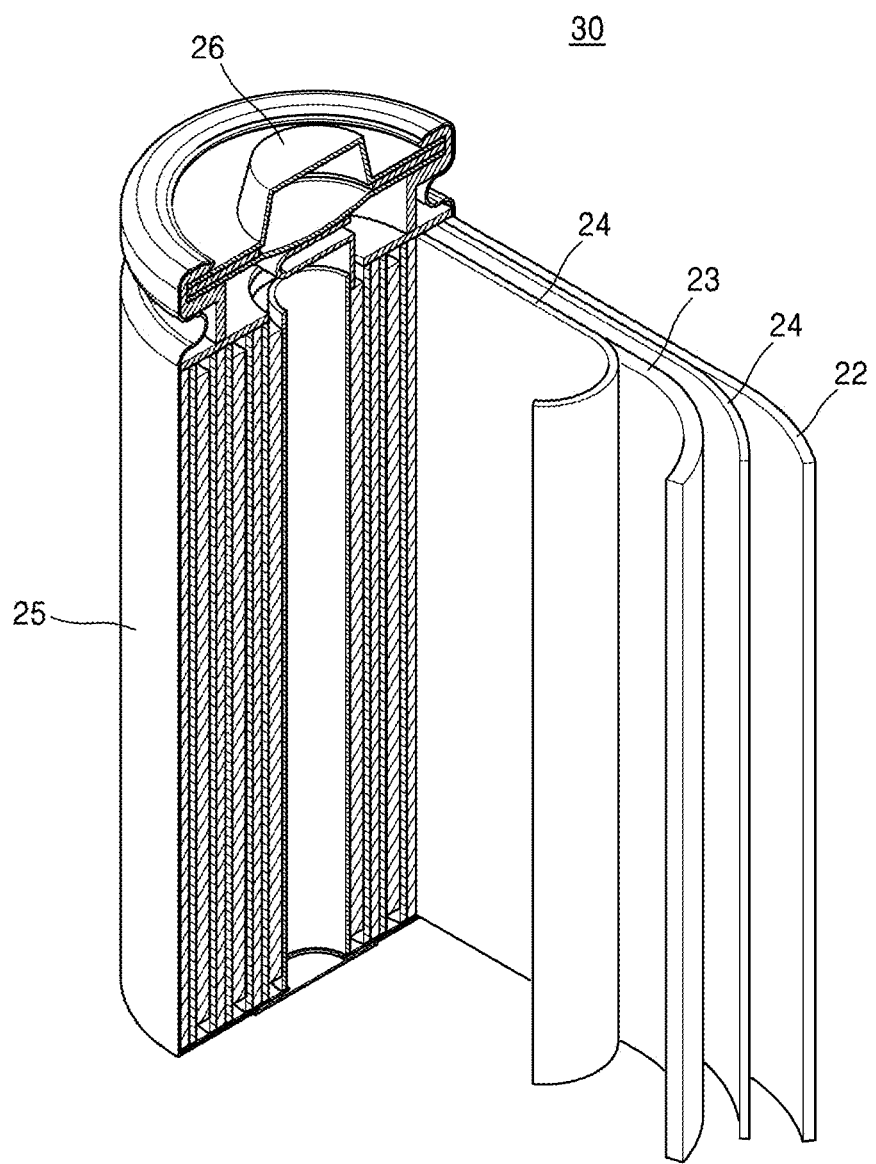
FIG. 2 illustrates a rough structure of a lithium secondary battery according to one or more exemplary embodiments.

FIG. 2 schematically illustrates a representative structure of a lithium secondary battery according to one or more exemplary embodiments of the present disclosure.

Referring to FIG. 2, the lithium secondary battery 30 may include a positive electrode 23, a negative electrode 22, and an organic/inorganic composite electrolyte 24 disposed between the positive electrode 23 and the negative electrode 22. The positive electrode 23, the negative electrode 22, and the organic/inorganic composite electrolyte 24 are wound or folded and housed in a battery container 25. Subsequently, an electrolyte is injected into the battery container 25, and the battery container 25 is sealed by a sealing member 26 such that the lithium secondary battery 30 may be completed. The battery container 25 may be formed in, for example, a cylindrical shape, a rectangular shape, a pouch shape, or a thin film shape. The lithium secondary battery may be a lithium ion battery.

The lithium secondary batteries may be used not only as batteries used as power sources of small devices such as, for example, cellular phones and portable computers, but also as unit batteries used in battery modules of medium to large sized devices including multiple batteries.

Examples of the medium to large sized devices may include: power tools; xEV including electric vehicles (EV), hybrid electric vehicles (HEV), and plug-in hybrid electric vehicles (PHEV); electric two wheeled vehicles including E-bikes and E-scooters; electric golf carts; electric trucks; electric commercial vehicles; and power storage systems. The lithium secondary batteries may be used in other applications in which high output power, high voltage, and high temperature driving are required. The lithium secondary batteries may be used in uses in which a high voltage range of about 4.3 V to about 4.6 V is required.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

1-1. Manufacturing Electrodes

Manufacturing Positive Electrodes

A) 85% by weight of LiCoO$_2$ as a positive electrode active material, 7.5% by weight of carbon black as a conducting agent and 7.5% by weight of PVdF as a binder were added in N-methyl-2-pyrrolidone (NMP) as a solvent to prepare a positive electrode mixture slurry. The positive electrode mixture slurry was coated and dried on an aluminum (Al) thin film having a thickness of about 20 μm as a positive electrode current collector to manufacture a positive electrode having a thickness of about 40 μm.

B) 85% by weight of LiNi$_{0.6}$Co$_{0.2}$Mn$_{0.2}$O$_2$ as a positive electrode active material, 7.5% by weight of carbon black as a conducting agent and 7.5% by weight of PVdF as a binder were added in N-methyl-2-pyrrolidone (NMP) as a solvent to prepare a positive electrode mixture slurry. The positive electrode mixture slurry was coated and dried on an aluminum (Al) thin film having a thickness of about 20 μm as a positive electrode current collector to manufacture a positive electrode having a thickness of about 40 μm.

Manufacturing a Negative Electrode

85% by weight of graphite powder as a negative electrode active material, 7.5% by weight of carbon black as a conducting agent and 7.5% by weight of PVdF as a binder were added in N-methyl-2-pyrrolidone (NMP) as a solvent to prepare a negative electrode mixture slurry. The negative electrode mixture slurry was coated and dried on a copper (Cu) thin film having a thickness of about 10 μm as a negative electrode current collector to manufacture a negative electrode having a thickness of about 40 μm.

1-2. Preparing an Organic/inorganic Composite Electrolyte Slurry (PVdF-HFP/Li$_7$La$_3$Zr$_2$O$_{12}$)

Polyvinylidenefluoride-hexafluoropropylene (PVdF-HFP) copolymer, Li$_7$La$_3$Zr$_2$O$_{12}$ powder and dibuthylphthalate (DBP) were added and mixed in acetone using a ball mill method for about 24 hours to prepare an electrolyte slurry including PVdF-HEP, Li$_7$La$_3$Zr$_2$O$_{12}$ and DBP at a weight ratio of about 10:90:10.

1-3. Manufacturing an Electrode-electrolyte Assembly

Figure 3:
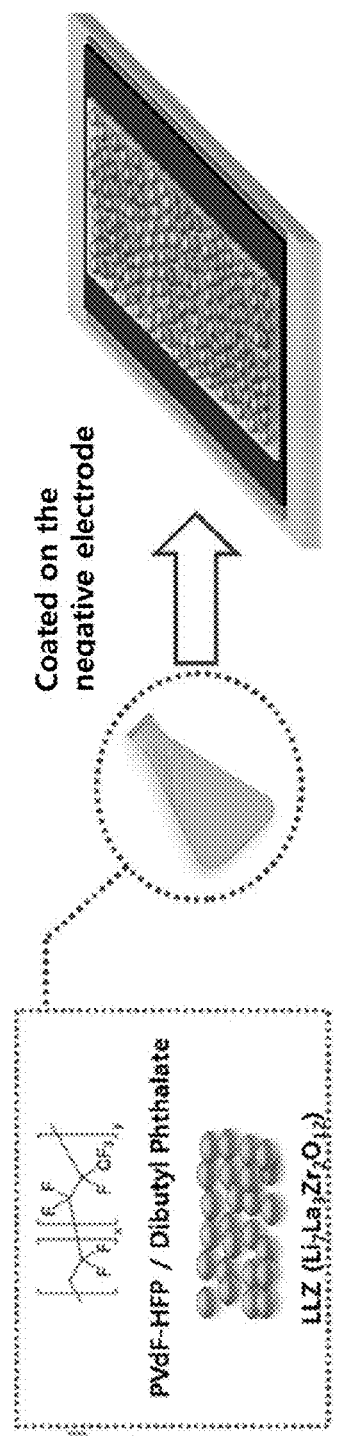
FIG. 3 illustrates a manufacturing process of an electrode-electrolyte assembly in Example 1.

As illustrated in FIG. 3, the electrolyte slurry was coated and dried on the negative electrode to manufacture an electrode-electrolyte assembly including an electrolyte layer having a thickness of about 30 μm. After impregnating the electrode-electrolyte assembly with methanol, DBP was extracted from the methanol-impregnated electrode-electrolyte assembly, and the DBP-extracted electrode-electrolyte assembly was vacuum dried to manufacture an electrode-electrolyte assembly.

1-4. Manufacturing a Coin Type Lithium Secondary Battery

The manufactured electrode-electrolyte assembly of Example 1-3 was assembled into a coin cell (CR 2032) type battery using the respective manufactured positive electrodes of Example 1-1, and a lithium secondary battery was manufactured using an ethylene carbonate/diethylene carbonate based electrolytic solution including ethylene carbonate and diethylene carbonate at a volume ratio of about 30:70 in which 1.15M lithium hexafluorophosphate (LiPF$_6$) was dissolved.

1-5. Manufacturing a Pouch Type Lithium Secondary Battery

The manufactured positive electrodes of Example 1-1 and the manufactured electrode-electrolyte assembly of Example 1-3 were cut to a size including a width of about 2 cm and a length of about 4 cm, and the cut positive electrodes and electrode-electrolyte assembly were laminated to assemble a battery, and a lithium secondary battery was manufactured using an ethylene carbonate/diethylene carbonate based electrolytic solution including ethylene carbonate and diethylene carbonate at a volume ratio of about 30:70 in which 1.15M lithium hexafluorophosphate (LiPF$_6$) was dissolved.

EXAMPLE 2

2-1. Preparing an Organic/inorganic Composite Electrolyte Slurry (PVdF-HFP/Li$_7$La$_3$Zr$_2$O$_{12}$)

An electrolyte slurry was prepared by performing the same process as in Example 1 except that PVdF-HEP, Li$_7$La$_3$Zr$_2$O$_{12}$ and DBP were used at a composition weight ratio of about 20:80:20.

2-2. Manufacturing an Electrode-electrolyte Assembly

An electrode-electrolyte assembly was manufactured by performing the same process as in Example 1 except that the prepared electrolyte slurry of Example 2-1 was used.

2-3. Manufacturing a Lithium Secondary Battery

A lithium secondary battery was manufactured by performing the same process as in Example 1 except that the manufactured electrode-electrolyte assembly of Example 2-2 was used.

COMPARATIVE EXAMPLE 1

A lithium secondary battery was manufactured by performing the same process as in Example 1 except that a PP separator (Celgard 2400) having a thickness of about 25 μm manufactured by Celgard Incorporated was used.

COMPARATIVE EXAMPLE 2

A lithium secondary battery was manufactured by performing the same process as in Example 1 except that SiO$_2$ powder instead of Li$_7$La$_3$Zr$_2$O$_{12}$ was used.

COMPARATIVE EXAMPLE 3

A lithium secondary battery was manufactured by performing the same process as in Example 1 except that the prepared electrolyte slurry was used after preparing an electrolyte slurry without adding DBP in the organic/inorganic composite electrolyte slurry when preparing an organic/inorganic composite electrolyte slurry including PVdF-HFP and Li$_7$La$_3$Zr$_2$O$_{12}$ in Example 1-2.

Figure 4A:
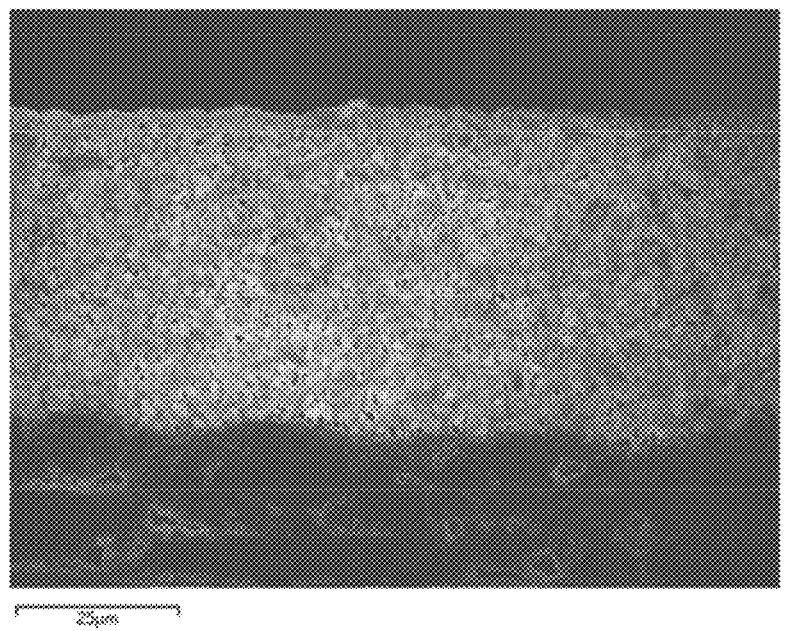
FIG. 4A illustrates scanning electron microscope (SEM) images of cross section of an organic/inorganic composite electrolyte prepared in Example 1.

[Test Example 1] Scanning Electron Microscope (SEM) Image Analysis of an Organic/inorganic Composite Electrolyte SEM images obtained from cross-section of the prepared organic/inorganic composite electrolyte of Example 1 through a field emission scanning electron microscope (FE-SEM) are represented in FIG. 4A. As shown in FIG. 4A, the organic/inorganic composite electrolyte was formed in a porous form.

Figure 4B:
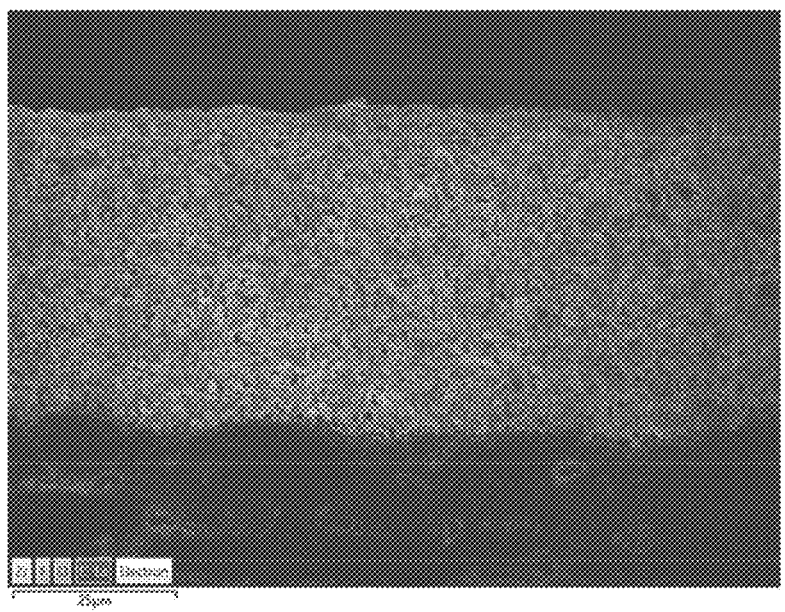
FIG. 4B illustrates an energy dispersive X-ray spectroscopy (EDS) analysis result for the cross section of the organic/inorganic composite electrolyte.

Energy dispersive X-ray spectroscopy (EDS) analysis results with respect to cross-section of the prepared organic/inorganic composite electrolyte of Example 1 are represented in FIG. 4B. As shown in FIG. 4B, zirconium (Zr), oxygen (O), carbon (C) and fluorine (F) were uniformly distributed throughout the organic/inorganic composite electrolyte.

Figure 5:
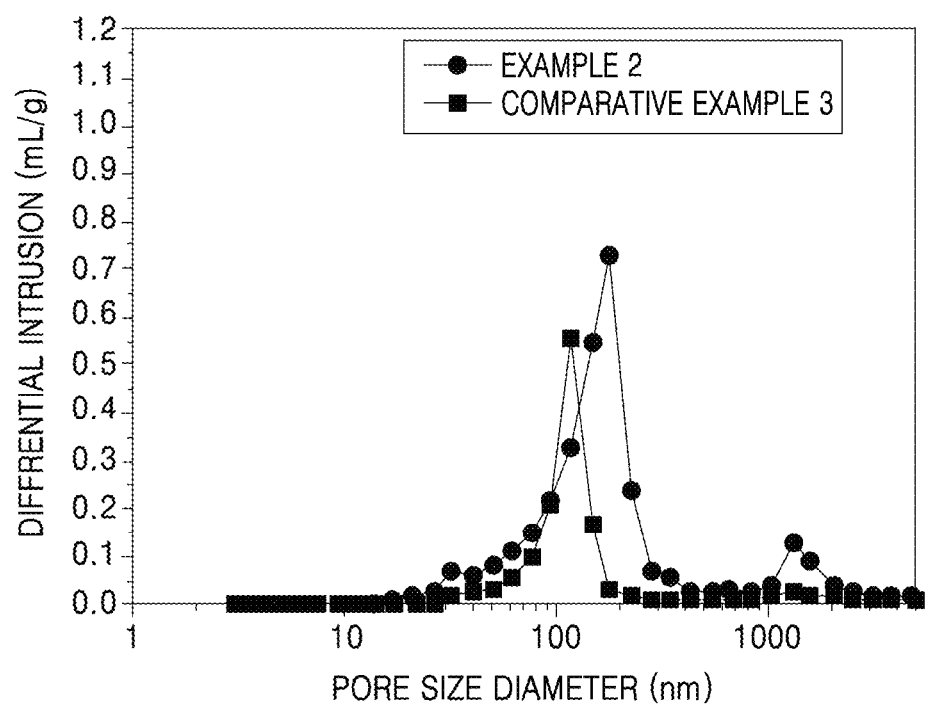
FIG. 5 illustrates a graph in which pore distributions of organic/inorganic composite electrolytes prepared in Example 2 and Comparative Example 3 are compared to each other.

[Test Example 2] Pore Distribution Analysis of an Organic/inorganic Composite Electrolyte According to Use of DBP Pore distributions of the prepared organic/inorganic composite electrolyte of Example 2 and the organic/inorganic composite electrolyte of Comparative Example 3 without using DBP were measured by a Mercury Porosimeter, and the measurement results are represented in FIG. 5.

As shown in FIG. 5, the pore distribution was shifted to a side of large pores, and a total porosity was large in the prepared organic/inorganic composite electrolyte of Example 2 using DBP as a pore-forming agent compared to the organic/inorganic composite electrolyte of Comparative Example 3 without using DBP. Total porosities of the prepared organic/inorganic composite electrolytes of Example 2 and Comparative Example 3 calculated through the graphs were 42.0% and 21.4% respectively.

Pores having a size of about 100 nm to about 300 nm in the organic/inorganic composite electrolyte of Example 2 accounted for about 60.2% of the total pore volume.

A second pore peak having a pore size range of about 1,000 nm to about 2,000 nm was shown in the organic/inorganic composite electrolyte of Example 2. The second pore peak was not shown in the organic/inorganic composite electrolyte of Comparative Example 3.

[Test Example 3] Evaluating Ion Conductivities of Organic/inorganic Composite Electrolytes To measure ion conductivities of the organic/inorganic composite electrolytes prepared in Examples 1 and 2 and Comparative Examples 1, 2 and 3, resistances of the electrolytes were first measured using an alternating current impedance method. A Zahner Electrik IM6 impedance analyzer was used as an analysis instrument. Measurements were made in a measuring frequency range of about 100 Hz to about 1 MHz. After measuring resistances of the electrolytes with respect to Example 2 and Comparative Example 3 to obtain impedance data, area specific resistances were obtained from the impedance data, ion conductivities of the electrolytes were calculated from the area specific resistances, and calculation results are represented in the following Table 1.

TABLE 1

| Classification | Ion conductivities (S/cm) |
| --- | --- |
| Example 1 | $1.1 \times 10^{-3}$ |
| Example 2 | $1.3 \times 10^{-3}$ |
| Comparative Example 1 | $2.9 \times 10^{-4}$ |
| Comparative Example 2 | $3.1 \times 10^{-4}$ |
| Comparative Example 3 | $5.1 \times 10^{-4}$ |

As represented in Table 1, the organic/inorganic composite electrolytes prepared in Examples 1 and 2 show ion conductivities higher than that of an electrolyte obtained by impregnating the PP separator of Comparative Example 1 with a liquid electrolyte. The organic/inorganic composite electrolyte prepared in Examples 2 shows an ion conductivity higher than that of the composite electrolyte prepared in Comparative Example 2. As represented in Table 1, the organic/inorganic composite electrolyte prepared in Examples 2 has an improved ion conductivity compared to the organic/inorganic composite electrolyte prepared in Comparative Example 3.

[Test Example 4] Evaluating Battery Stabilities of Organic/inorganic Composite Electrolytes To evaluate battery stabilities of the organic/inorganic composite electrolytes prepared in Example 2 and Comparative Example 1, a charge and discharge process was performed 100 times on the lithium secondary batteries of Example 2 and Comparative Example 1 at a current density of about 0.5C and a cut off voltage of about 2.6 V to about 4.3 V, and the lithium secondary batteries that had completed the charge and discharge process were heated to the following conditions using an accelerating rate calorimetry (ARC) to evaluate self-heating rate and thermal stability characteristics.

Temperature range: 50 to 350° C.
Temperature step: 5° C. (wait time: 15 min)
Temperature rate sensitivity: 0.02 (° C./min)

Figure 6:
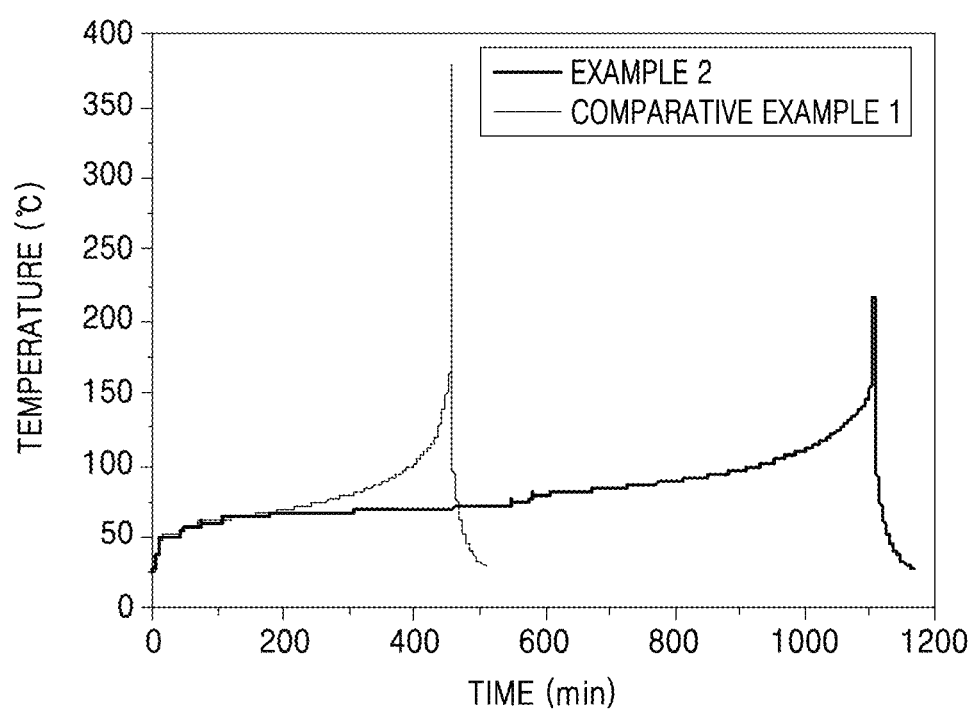
FIG. 6 illustrates measurement results of temperature variations with respect to time in lithium secondary batteries of Example 2 and Comparative Example 1.
Figure 7:
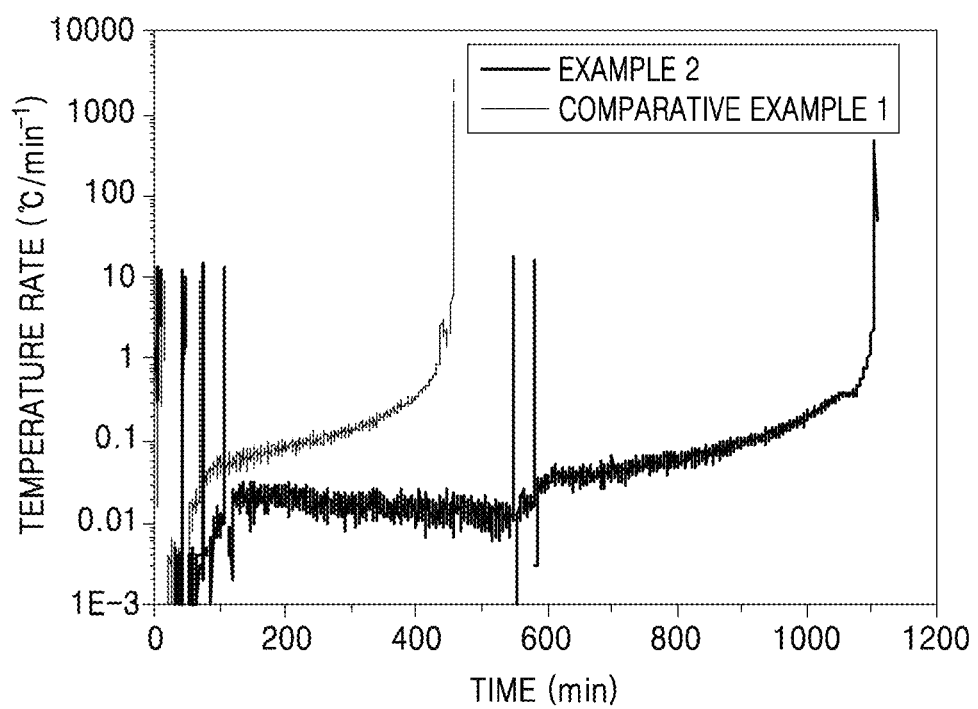
FIG. 7 illustrates measurement results of temperature rates with respect to time in the lithium secondary batteries of Example 2 and Comparative Example 1.
Figure 8:
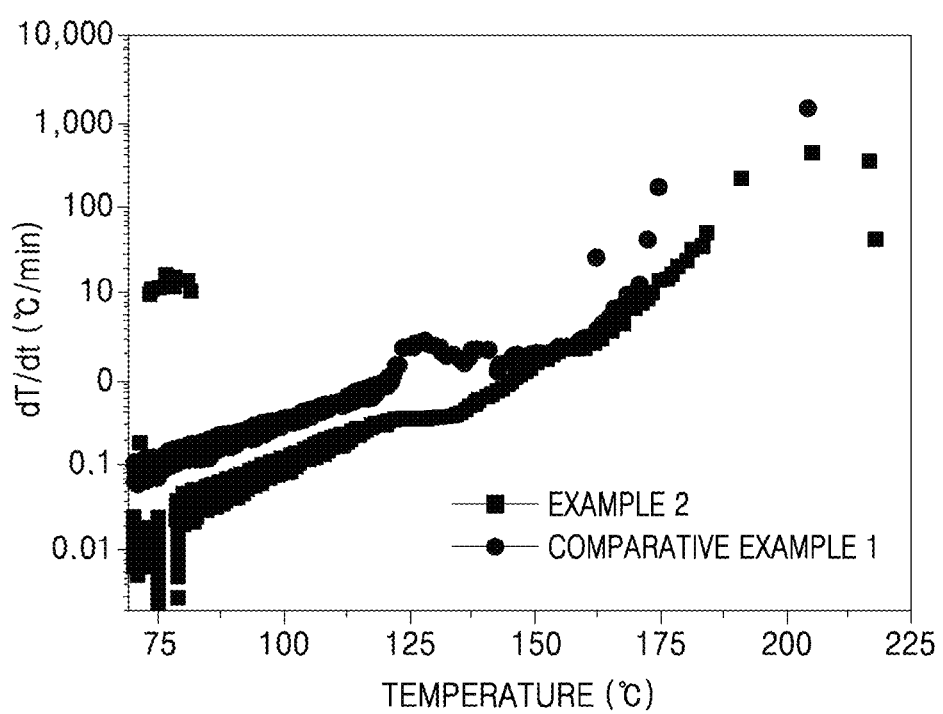
FIG. 8 illustrates measurement results of temperature rates with respect to temperature in the lithium secondary batteries of Example 2 and Comparative Example 1.

In the lithium secondary batteries of Example 2 and Comparative Example 1, temperature changes with respect to time, temperature rates with respect to time, and temperature rates with respect to temperature are represented in FIGS. 6, 7 and 8 respectively.

As shown in FIGS. 6 to 8, the organic/inorganic composite electrolyte prepared in Example 2 using DBP had a high thermal start and a significantly delayed thermal runaway time compared to the organic/inorganic composite electrolyte of Comparative Example 1. An increasing temperature during thermal runaway was also shown to be greatly lowered in the battery manufactured in Example 2 compared to the battery manufactured in Comparative Example 1. It may be seen from the above results that the organic/inorganic composite electrolyte prepared in Example 2 improved thermal stability of the lithium secondary battery compared to the organic/inorganic composite electrolyte prepared in Comparative Example 1.

[Test Example 5] Evaluating Performances of Coin Type Lithium Secondary Batteries A charge and discharge process was performed on the coin type lithium secondary batteries manufactured in Examples 1 and 2 and Comparative Example 1 at a current density of about 0.5C and a cut off voltage of about 2.6 V to about 4.3 V to obtain charge and discharge curves for the charge and discharge process-performed coin type lithium secondary batteries.

Figure 9:
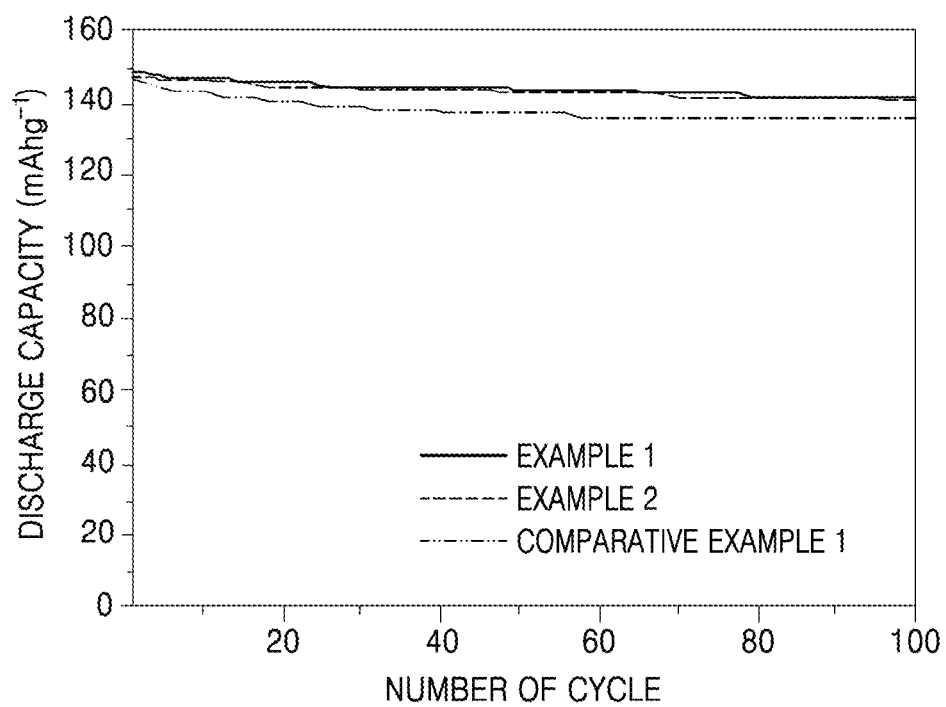
FIG. 9 illustrates results of measuring discharge capacities per cycle of coin type lithium secondary batteries which are manufactured in Example 1, Example 2 and Comparative Example 1, and which use $LiCoO_2$ as a positive electrode active material.

FIG. 9 and the flowing Table 2 represent discharge capacities and lifetime characteristics of lithium secondary batteries manufactured using $LiCoO_2$ as a positive electrode active material.

TABLE 2

| Classification | First discharge capacity (mAh/g) | $100^{th}$ discharge capacity (mAh/g) | Capacity retention ratio (%) |
|---|---|---|---|
| Example 1 | 149.7 | 141.9 | 94.8 |
| Example 2 | 148.8 | 141.7 | 95.5 |
| Comparative Example 1 | 147.5 | 135.2 | 91.7 |

Figure 10:
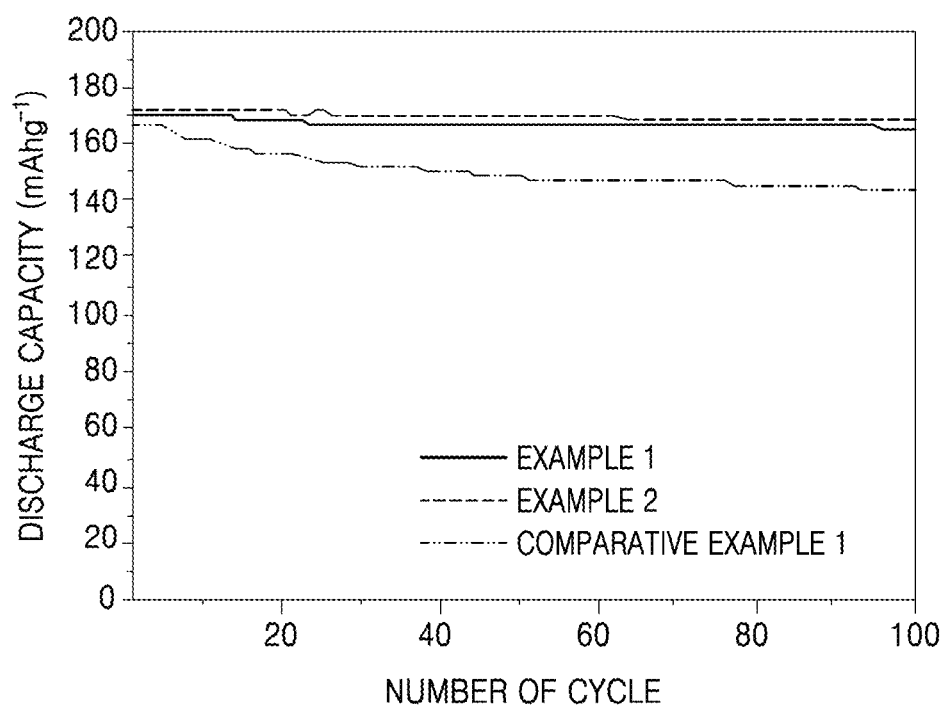
FIG. 10 illustrates results of measuring discharge capacities per cycle of coin type lithium secondary batteries which are manufactured in Example 1, Example 2 and Comparative Example 1, and which use $LiNi_{0.6}Co_{0.2}Mn_{0.2}O_2$ as a positive electrode active material.

FIG. 10 and the flowing Table 3 represent discharge capacities and lifetime characteristics of lithium secondary batteries manufactured using $LiNi_{0.6}Co_{0.2}Mn_{0.2}O_2$ as a positive electrode active material.

TABLE 3

| Classification | First discharge capacity (mAh/g) | $100^{th}$ discharge capacity (mAh/g) | Capacity retention ratio (%) |
|---|---|---|---|
| Example 1 | 171.4 | 166.4 | 96.9 |
| Example 2 | 173.7 | 169.1 | 97.3 |
| Comparative Example 1 | 169.0 | 144.9 | 85.8 |

As shown in FIGS. 9 to 10 and Tables 2 to 3, the lithium secondary battery manufactured using the organic/inorganic composite electrolyte of Example 1 is excellent in both capacity retention ratio and discharge capacity after 100 cycles of the charge and discharge process compared to the lithium secondary battery manufactured using the organic/inorganic composite electrolyte of Comparative Example 1.

[Test Example 6] Evaluating Performance of a Pouch Type Lithium Secondary Battery A charge and discharge process was performed on the pouch type lithium secondary battery manufactured in Example 1 at a current density of about 0.5C and a cut off voltage of about 2.6 V to about 4.3 V to obtain charge and discharge curves for the charge and discharge process-performed pouch type lithium secondary battery.

Figure 11:
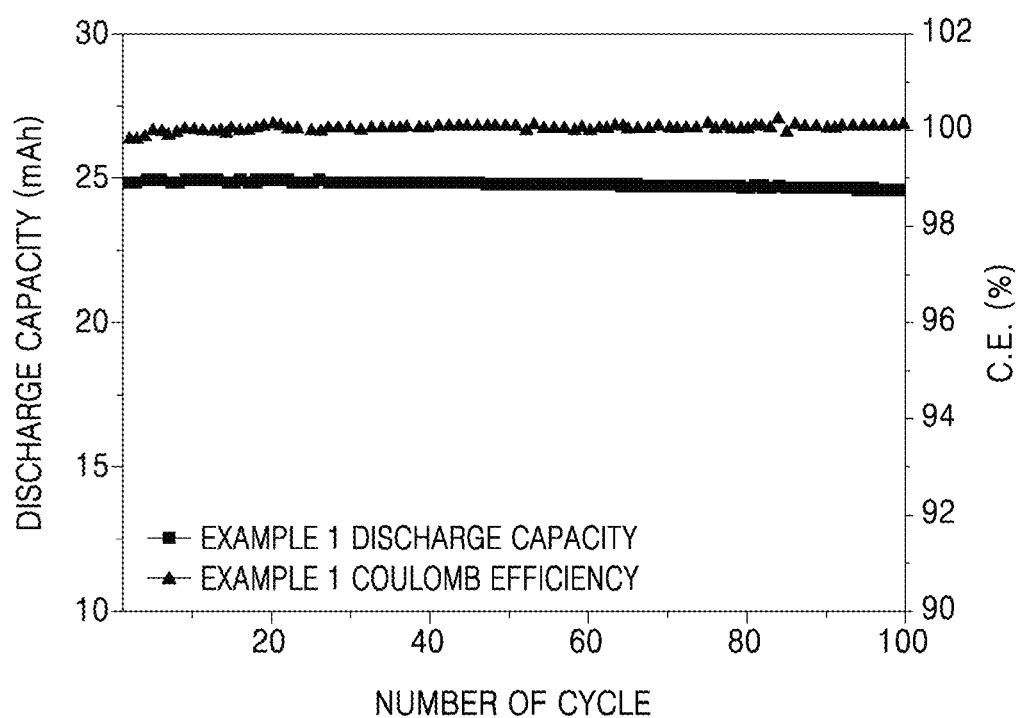
FIG. 11 illustrates a result of measuring a discharge capacity per cycle of a pouch type lithium secondary battery which is manufactured in Example 1, and which uses $LiNi_{0.6}Co_{0.2}Mn_{0.2}O_2$ as a positive electrode active material.

FIG. 11 and the flowing Table 4 represent discharge capacities and lifetime characteristics of the lithium secondary battery manufactured using $LiNi_{0.6}Co_{0.2}Mn_{0.2}O_2$ as a positive electrode active material.

TABLE 4

| Classification | First discharge capacity (mAh/g) | $100^{th}$ discharge capacity (mAh/g) | Capacity retention ratio (%) |
|---|---|---|---|
| Example 1 | 24.84 | 24.58 | 99.0 |

As shown in FIG. 11 and Table 4, the lithium secondary battery manufactured using the organic/inorganic composite electrolyte of Example 1 represents considerably excellent lifetime characteristics even in the pouch type lithium secondary battery that was constructed to a relatively large area compared to the coin type lithium secondary battery.

[Test Example 7] Controlling Injection Amounts of Liquid Electrolytic Solutions

Lithium secondary batteries were manufactured using the manufactured electrode-electrolyte assemblies and the prepared LiCoO2 positive electrode active material of Example 1 and Comparative Example 1. An amount of the injected liquid electrolyte was controlled to assemble the batteries. A charge and discharge process was performed on the lithium secondary batteries at a current density of about 0.5C and a cut off voltage of about 2.6 V to about 4.3 V, and changes in discharge capacities according to the amount of the liquid electrolyte are represented in FIG. 12.

Figure 12:
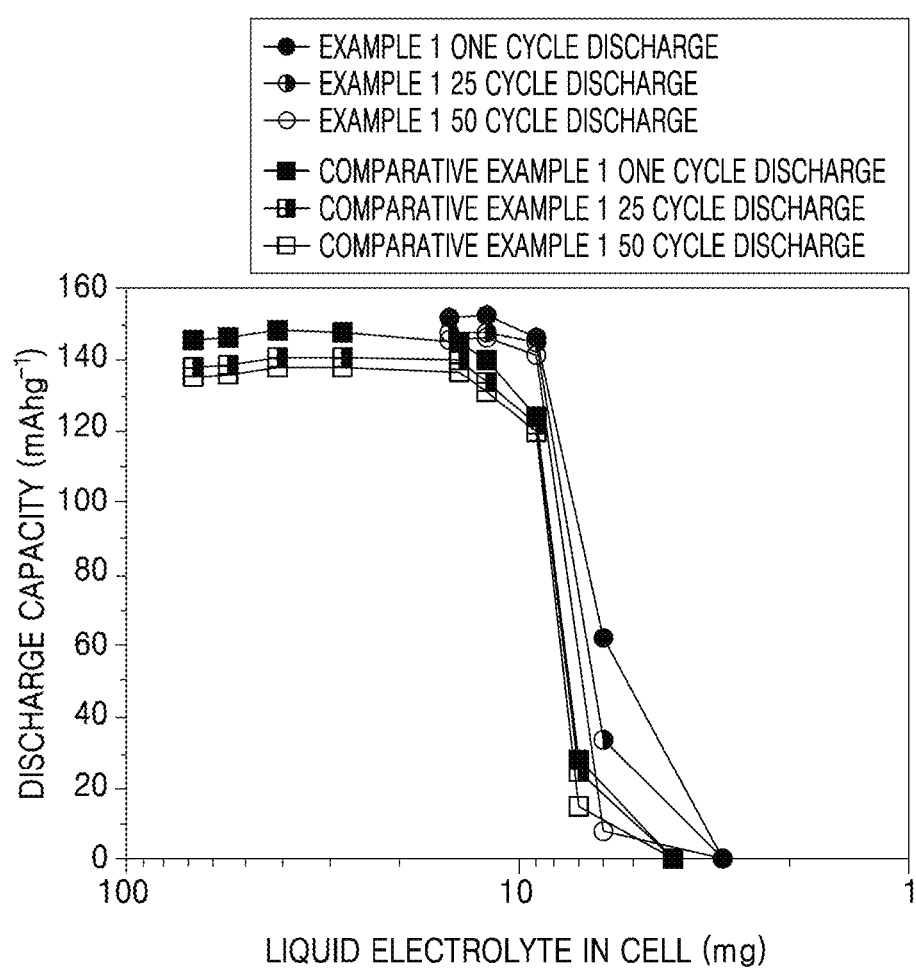
FIG. 12 illustrates measurement results of discharge capacity variations according to amounts of liquid electrolytes in lithium secondary batteries manufactured using electrode-electrolyte assemblies of Example 1 and Comparative Example 1.

As shown in FIG. 12, a minimum required amount of the liquid electrolyte was decreased in the battery manufactured using the electrode-electrolyte assembly of Example 1 compared to the battery manufactured using the electrode-electrolyte assembly of Comparative Example 1.

By way of summation and review, liquid electrolytes, which may have high ionic conductivity and low viscosity characteristics, may be used in high output and high capacity lithium secondary batteries.

In lithium secondary batteries, separators of polyolefin series may be used to prevent short circuits between electrodes within the batteries. The polyolefin series separators may be melted at about 200° C. or less. When temperatures of the batteries are increased to high temperatures by internal and/or external stimuli, volume changes such as contraction and melting of the separators may occur, and explosion may occur due to, for example, short circuits of both electrodes or emission of electric energy.

Hydrophobic polymers may be used as raw material in the polyolefin series separators, and phenomena may be generated in which affinities of the separators with the liquid electrolytes are dropped, and ionic conductivities of electrolyte layers are reduced.

One or more exemplary embodiments include organic/inorganic composite electrolytes which may not require uses of separators and improve battery characteristics and battery safety by decreasing contents of the liquid electrolytes. One or more exemplary embodiments include electrode-electrolyte assemblies using the organic/inorganic composite electrolytes. One or more exemplary embodiments include lithium secondary batteries employing the electrode-electrolyte assemblies. One or more exemplary embodiments include manufacturing methods of the electrode-electrolyte assemblies.

As described above, according to the one or more of the above exemplary embodiments, the organic/inorganic composite electrolyte may not need to use a polyolefin-based separator, and may maintain a high degree of ion conductivity while reducing the content of an organic electrolytic solution by using inorganic particles having lithium ion conductivity. Cycle characteristics and safety of the lithium secondary battery may be improved owing to the organic/inorganic composite electrolyte.

As described above, a lithium secondary battery employing an electrode-electrolyte assembly using an organic/inorganic composite electrolyte according to one or more exemplary embodiments may exhibit excellent battery lifetime characteristics even when the lithium secondary battery includes a small amount of the liquid electrolyte, and the lithium secondary battery may exhibit improved stability, for example, due to a reduction in the content of the liquid electrolyte.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A porous organic/inorganic composite electrolyte, comprising:
an organic matrix and inorganic particles, the organic matrix and the inorganic particles being combined in a weight ratio of about 50:50 to about 1:99, wherein the organic/inorganic composite electrolyte has:
a first pore peak in a pore size range of about 100 nm to about 300 nm in a total pore distribution chart,
a second pore peak in a pore size range of about 1,000 nm to about 2,000 nm in the total pore distribution chart, wherein the first pore peak and the second pore peak are in the form of separate peaks,
50% or more of pores having a pore size range of about 100 nm to about 300 nm based on a total pore volume,
5% to about 20% of pores having a pore size range of about 1,000 nm to about 2,000 nm based on the total pore volume, and
a total porosity of about 5% to about 50%,
wherein the inorganic particles include:
an oxide-based material represented by $Li_{7-y}La_{3-x}A_xZr_{2-y}M_yO_{12}$ where A is Y, Nd, Sm or Gd, M is Nb or Ta, $0 \leq x < 3$, and $0 \leq y < 2$, or
a LiPON-based inorganic material represented by $Li_{3-y}PO_{4-x}N_x$, where $0 < y < 3$ and $0 < x < 4$.

2. The organic/inorganic composite electrolyte as claimed in claim 1, wherein the inorganic particles are embedded and dispersed in the organic matrix.

3. The organic/inorganic composite electrolyte as claimed in claim 2, wherein the organic matrix includes a polymer for a gel polymer electrolyte.

4. The organic/inorganic composite electrolyte as claimed in claim 2, wherein the organic matrix includes one or more of PVdF (polyvinylidene fluoride), a PVdF-HFP copolymer (polyvinylidene fluoride-hexafluoropropylene copolymer), a PVdF-TFE copolymer (polyvinylidene fluoride-tetrafluoroethylene copolymer), a PVdF-CTFE copolymer (polyvinylidene fluoride-chlorotrifluoroethylene copolymer), a PVdF-PFA copolymer (polyvinylidene fluoride-perfluorovinylether copolymer), PAN (polyacrylonitrile), PMMA (poly(methyl methacrylate)), PEO (poly(ethylene oxide)), PPO (polypropylene oxide), PVC (polyvinyl chloride), PVA (polyvinyl alcohol), PVAc(polyvinyl acetate), PVN (polyvinyl naphthalene), polyester sulfide, polybutadiene, derivatives thereof, or a copolymer thereof.

5. The organic/inorganic composite electrolyte as claimed in claim 1, further comprising a liquid electrolyte impregnated in the organic/inorganic composite electrolyte.

6. An electrode-electrolyte assembly, comprising:
an electrode; and
an electrolyte layer disposed on at least one side of the electrode and including the organic/inorganic composite electrolyte as claimed in claim 1.

7. The electrode-electrolyte assembly as claimed in claim 6, wherein the electrolyte layer has a thickness of about 1 μm to about 200 μm.

8. The electrode-electrolyte assembly as claimed in claim 6, wherein a thickness ratio of the electrode and the electrolyte layer is about 100:1 to about 100:1,000.

9. A lithium secondary battery, comprising the electrode-electrolyte assembly as claimed in claim 6.

10. The organic/inorganic composite electrolyte as claimed in claim 1, wherein:
the inorganic particles include the oxide-based inorganic material represented by $Li_{7-y}La_{3-x}A_xZr_{2-y}M_yO_{12}$ where A is Y, Nd, Sm or Gd, M is Nb or Ta, $0 < x < 3$, and $0 < y < 2$.

11. The organic/inorganic composite electrolyte as claimed in claim 1, wherein:
the organic matrix includes a polyvinylidene fluoride-hexafluoropropylene copolymer, and
the inorganic particles include $Li_7La_3Zr_2O_{12}$.

12. A method of manufacturing the electrode-electrolyte assembly as claimed in claim 6, the method comprising:
preparing an electrolyte slurry including lithium ion conductive inorganic particles, a polymer for a gel polymer electrolyte, a pore-forming agent, and a first organic solvent;
applying the electrolyte slurry to at least one side of an electrode and drying the electrolyte slurry applied to the electrode so as to form an organic/inorganic composite electrolyte layer; and
removing the pore-forming agent from the organic/inorganic composite electrolyte layer using a second organic solvent.

13. The method for manufacturing the electrode-electrolyte assembly as claimed in claim 12, wherein the pore-forming agent includes one or more of dibutyl phthalate (DBP), dioctyl phthalate (DOP), ethylene carbonate (EC), or propylene carbonate (PC).

14. The method for manufacturing the electrode-electrolyte assembly as claimed in claim 12, wherein the first organic solvent includes one or more of acetone, tetrahydrofuran (THF), dimethylformamide (DMF), dimethyl sulfoxide (DMSO), dimethylacetamide (DMAc), or N-methyl pyrrolidone (NMP).

15. The method for manufacturing the electrode-electrolyte assembly as claimed in claim 12, wherein the second organic solvent includes one or more of methanol, ethanol, dimethyl carbonate, hexane, heptane, octane, or diethyl ether.

\* \* \* \* \*